Aug. 18, 1959 L. S. WILLIAMS Re. 24,686
BALL BEARING
Original Filed Dec. 14, 1955 3 Sheets-Sheet 1
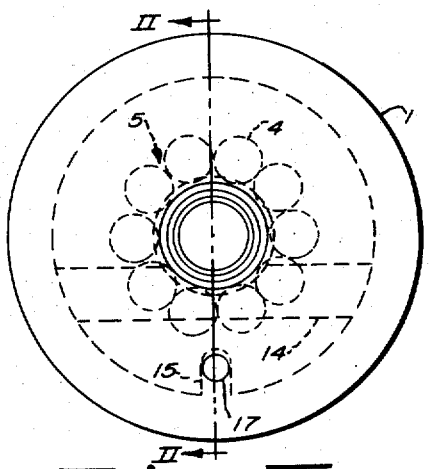
Fig. I
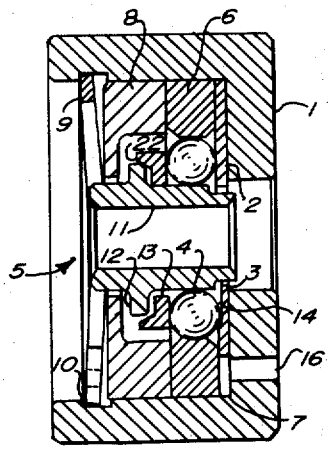
Fig. II
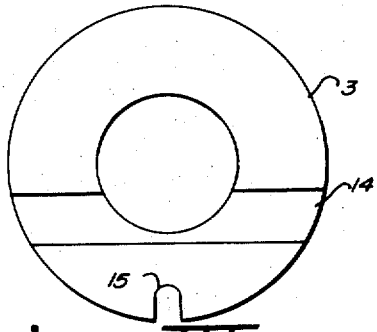
Fig. III
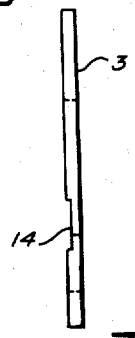
Fig. IV
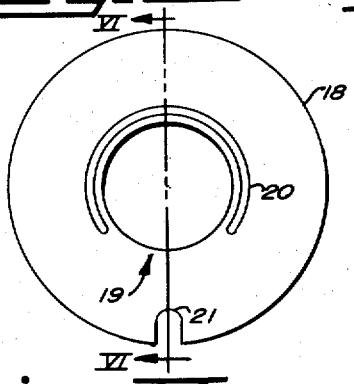
Fig. V
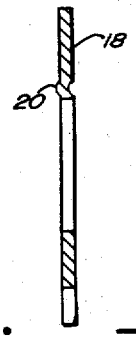
Fig. VI
INVENTOR.
LAWRENCE S. WILLIAMS
BY
Marshall, Marshall & Gearing
ATTORNEYS BALL BEARING
Original Filed Dec. 14, 1955 3 Sheets-Sheet 2
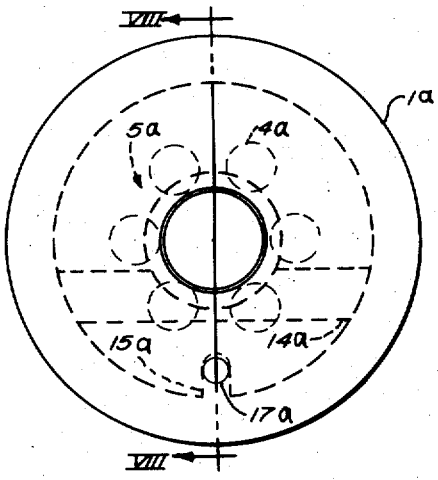
Fig VII
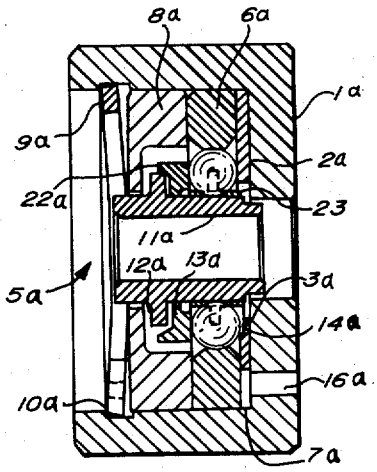
Fig. VIII
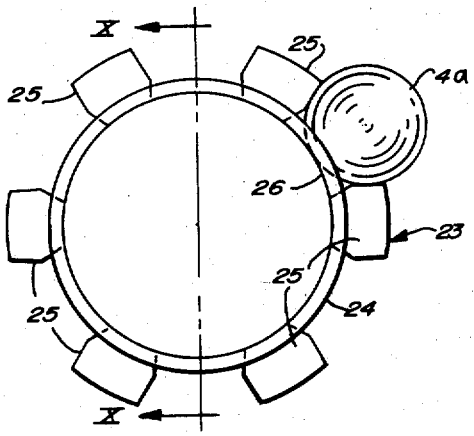
Fig. IX
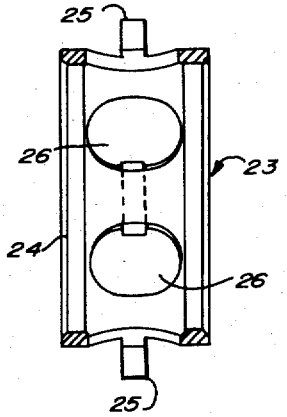
Fig. X
INVENTOR.
LAWRENCE S. WILLIAMS
BY
Marshall, Marshall + Yeasting
ATTORNEYS BALL BEARING
Original Filed Dec. 14, 1955 3 Sheets-Sheet 3
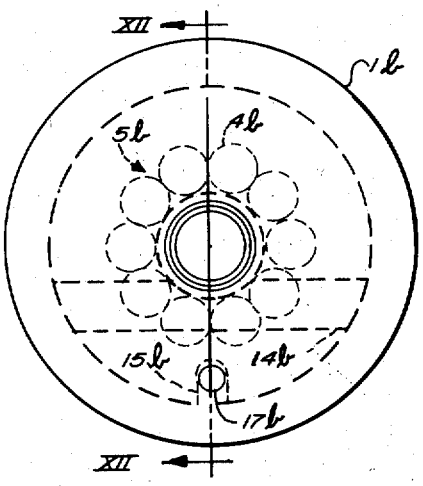
Fig. XI
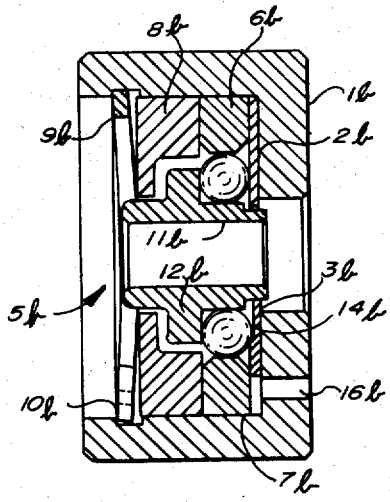
Fig. XII
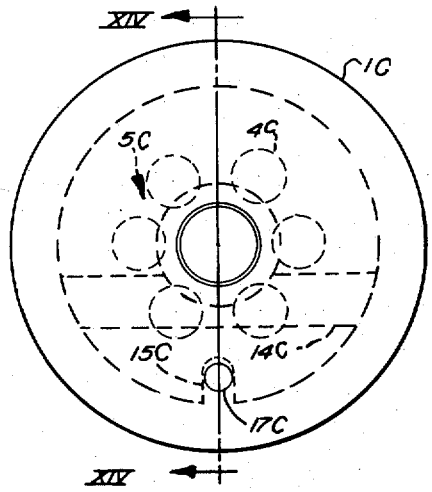
Fig. XIII
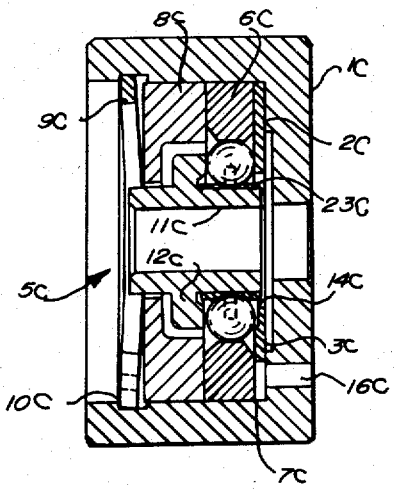
Fig. XIV
INVENTOR.
LAWRENCE S. WILLIAMS
BY
Marshall, Marshall & Yeasting
ATTORNEYS United States Patent Office Re. 24,686
Reissued Aug. 18, 1959

24,686

BALL BEARING

Lawrence S. Williams, Toledo, Ohio, assignor, by mesne assignments, to Toledo Scale Corporation, Toledo, Ohio, a corporation of Ohio Original No. 2,848,286, dated August 19, 1958, Serial No. 553,101, December 14, 1955. Application for reissue October 30, 1958, Serial No. 770,877

23 Claims. (Cl. 308—193)

Matter enclosed in heavy brackets [ ] appears in the original patent but forms no part of this reissue specification; matter printed in italics indicates the additions made by reissue.

This invention relates to ball bearings which are designed to be free from so-called "hang-up."

Hang-up may be defined as a departure of a bearing from normal tracking which causes binding and produces friction in the bearing. Hang-up is generally associated with cylindrical raceway bearings, oiling, and unsymmetrical ball spacers and often causes serious errors in measurements made by precision devices such as weighing scales.

When the load on a weighing scale suddenly is substantially increased or decreased or when the indicating chart shaft is lifted and dropped by the movement of the rack which drives the shaft, hang-up in the scale bearings may occur and may cause errors as much as two or three [pounds] *ounces* in a scale having only fifteen pounds capacity. Hang-up may be absent for a series of weighings and then become persistent or vice versa. Hence, it may be described as an incident error. It occurs most frequently and of greatest amount when large loads are applied or removed and can always be released by endwise vibration of the chart. It is infrequent with dry bearings, is induced by unsymmetrical ball spacers, and is aggravated by misaligned bearings and shaft wobble. When the dashpot on the scale is closed down for dead beat operation (high damping) to make the scale operate more quickly, hang-up may become particularly bad.

Hang-up is distinct from "wind-up" which results from the fact that as the bearing balls are rotated by the shaft some of them climb the uphill side of the race. However, both are departures of a bearing from normal tracking.

It has been found, after a prolonged and careful study, that hang-up is caused by end thrust, i.e., axial pressure of balls under load against the washers of ball races which causes binding in the bearing resulting in friction. Such cause may be eliminated, according to the invention, by isolating the thrust and radial load functions of the bearing, providing symmetrical ball spacers (or none) are used.

The principal object of this invention is to provide an improved ball bearing assembly which is so constructed and designed as to be free from hang-up.

More specifically, the principal object of the invention is to provide an improved ball bearing assembly which is so constructed and designed that axial pressure on the bearing balls under load does not occur.

Another object of the invention is to provide a simple ball bearing assembly that is easy to manufacture to a high degree of precision and that is easy to assemble in a housing which receives and supports the bearing.

Other objects and advantages are apparent from the following description of preferred embodiments of the invention.

According to the invention, the improved ball bearing assembly includes an outer race, an inner race, and a series of bearing balls which are kept tracking in a substantially vertical plane by means of guides at the sides of the balls. One of such guides has a depressed portion located below the inner race to permit axial movement of the balls under load so that axial pressure of said balls under load against said guide does not occur. The other of such guides may be in the form of a thrust collar which is easily moved by the balls under load to permit axial movement so that substantial axial pressure of said balls under load against the collar does not occur. The invention further contemplates the use of ball spacing rings that are symmetrical with respect to the plane of rotation of the balls to avoid end thrust which may occur supplementally from spacers as heretofore designed. The invention also contemplates improved supporting means for the ball bearing assembly which includes a housing for receiving, supporting, and axially positioning the outer race of the bearing.

Preferred embodiments of the invention are illustrated in the accompanying drawings.

In the drawings:

Figure I is a side elevation of the ball bearing assembly and its housing.

Figure II is a vertical section taken along the line II—II of Figure I.

Figure III is a side elevation of the thrust washer which is shown in its assembled position in Figures I and II.

Figure IV is an end elevation of the thrust washer which is shown in Figure III.

Figure V is a side elevation of a modified thrust washer which may be used in place of the thrust washer shown in Figures I, II, III and IV.

Figure VI is a vertical section taken along the line VI—VI of Figure V.

Figure VII is a side elevation which is similar to Figure I, the only differences being that a ball spacing ring is employed and a lesser number of bearing balls are included in the bearing assembly.

Figure VIII is a vertical section taken along the line VIII—VIII of Figure VII.

Figure IX is an enlarged side elevation of the ball spacing ring which is illustrated in its assembled position in Figures VII and VIII.

Figure X is a vertical section taken along the line X—X of Figure IX.

Figure XI is a side elevation of a modified ball bearing assembly and its housing.

Figure XII is a vertical section taken along the line XII—XII of Figure XI.

Figure XIII is a side elevation which is similar to Figure XI, the only differences being that a ball spacing ring is employed and a lesser number of bearing balls are included in the bearing assembly.

Figure XIV is a vertical section taken along the line XIV—XIV of Figure XIII.

These specific figures and the accompanying description are intended merely to illustrate the invention but not to impose limitations on the claims.

Referring to Figures I and II, a housing 1, cup-shaped in form, has a radial wall 2 adapted to axially position a hardened steel thrust washer 3 serving as a side guide for a series of bearing balls 4 held within a bearing assembly 5. The housing 1 is adapted to be clamped in a frame member of a weighing scale to rotatably support one end of an ordinary indicating chart shaft (not shown). The other end of the shaft may be supported similarly. The housing 1, of course, may be used to rotatably support other kinds of loads. An outer race 6 for the bearing balls 4 is axially positioned against the thrust washer 3 and is radially positioned by engagement with a cylindrical surface 7 of the housing 1. A race retaining plate 8 bears against the other side of the outer race 6 and is held in position in the cup of the housing by a bowed annular clamping ring 9 which, when in place, contacts the retaining plate 8 at diametrically opposed points and contacts a shoulder 10 of a groove in the bore of the cup-shaped housing.

The clamping ring 9 is generally C-shaped and is of resilient construction. It is known on the market as a "Truarc" ring. The ring is bowed laterally like a tension washer and is inserted into the bore or interior of the housing 1 by a tool which fits the ends of the C-shape and compresses or draws them together to reduce the diameter of the ring. Once in position and the force of the tool relieved, the ring expands to accurately and tightly fit the annular groove in which it is placed. This arrangement resiliently and securely holds the outer race 6 in axial position.

The bearing assembly 5 also includes an inner race 11 which has a running fit on the bearing balls 4 and within which may be fixed an end of the chart shaft. Axial movement of the chart shaft may be limited as shown in application Serial No. 434,759 filed June 7, 1954. The inner race 11 has an integrally formed collar 12 which axially positions a thrust collar 13 loosely mounted on the inner race at one side of the bearing balls 4. The thrust washer 3 and the thrust collar 13 function as guiding means at the sides of the bearing balls 4 to keep the balls tracking in a substantially vertical plane.

Heretofore, axial pressure of bearing balls under load against the thrust washers of ball races, i.e., end thrust, caused "hang-up" as hereinbefore defined. This cause has been eliminated according to the invention by improving the design of the thrust members which as specifically shown are the thrust washer 3 and the thrust collar 13.

The thrust washer 3, shown in detail in Figures III and IV, has a horizontal depressed area or channel 14 to permit axial movement of the bearing balls 4 under load so that axial pressure of said balls under load against said thrust washer does not occur. The thrust washer 3 has a slot 15 which is aligned with a hole 16 in the housing 1 by means of a pin 17 so that when the housing 1 is assembled in the weighing scale with the hole 16 down and plumb the channel 14 will be level. This is necessary, since the force of gravity is involved, i.e., the bearing balls 4 above the inner race 11 carry no load so that no substantial axial pressure of bearing balls against the thrust washer can occur in that area, however, the bearing balls 4 below the inner race 11 are under load and might press against the thrust washer with great force if it were not for the properly located channel 14 which permits axial movement of the bearing balls. Any such departure of the bearing balls 4 from normal tracking is corrected by the unchanneled part of the thrust washer 3 which keeps the balls tracking in a substantially vertical plane.

A modified thrust washer 18, which may be substituted for the thrust washer 3 with equal success, is illustrated in Figures V and VI. The thrust washer 18 has a depressed area 19 formed by means of a circular guiding ridge 20 located mostly above the inner race 11 which ridge spaces the unloaded bearing balls 4 from the body of the thrust washer 18 to permit axial movement of the balls under load below the inner race toward the body of the thrust washer so that axial pressure of said balls under load against said thrust washer does not occur. A slot 21 in the thrust washer 18 is like the slot 15 in the thrust washer 3 and has the same function.

The thrust collar 13 has a radial wall serving as a side guide for the bearing balls 4 and a flange 22 which cooperates with the integrally formed collar 12 on the inner race 11. The thrust collar 13 is loosely mounted on the inner race 11 and there is play between the flange 22 and the collar 12 on the inner race. As shown in Figure II, when the flange 22 touches the collar 12 on the inner race at the top of the inner race 11, the flange 22 is spaced from the collar 12 at the bottom of the inner race 11. Hence, slight pressure of the bearing balls 4 *in the lower part of the race where they are* under load against *the lower part of* the thrust collar 13 causes it to move axially relieving such pressure and permitting axial movement of the balls under load so that substantial axial pressure of said balls under load against the thrust collar 13 does not occur. There is thus provided guiding means at both sides of the bearing balls 4 to keep them tracking in a substantially vertical plane which means are so designed that substantial axial pressure of the balls under load against the guiding means does not occur. Hence, end thrust causing hang-up is eliminated.

It has been found that the structure shown in Figures I–VI, by isolating the thrust and radial load functions of the bearing, entirely eliminates hang-up. However, such structure will not entirely eliminate hang-up when unsymmetrical ball spacing rings, as heretofore designed, are used. This is because a supplemental source of end thrust resided in the prior art spacers.

The ball bearing assembly shown in Figures VII and VIII is exactly like the assembly hereinbefore described except that a ball spacing ring 23 is used and the series of spaced apart bearing balls only numbers six. Similar reference numerals in Figures VII and VIII identify parts which are exact in structure and function to those shown in Figures I and II. The ball spacing ring 23, shown in enlarged detail in Figures IX and X, comprises a body 24 having a plurality of equally spaced apart radially extending spacing members 25 and a plurality of equally spaced apart holes 26 which receive the bearing balls 4a. The ball spacing ring 23 is symmetrical with respect to the plane of rotation of the bearing balls 4a and it has been found that such a ring avoids end thrust which may occur supplementally from spacers as heretofore designed.

A modification of the ball bearing assembly 5 illustrated in Figures I and II is shown in Figures XI and XII. Similar reference numerals in Figures XI and XII identify parts which are similar in structure and function to those shown in Figures I and II. The assembly illustrated in Figures XI and XII differs in that a large collar 12b on the inner race 11b occupies the space taken up by the thrust collar 13 (Figure II) which is not used in the modified structure. The collar 12b (Figure XII) on the inner race 11b guides the bearing balls 4b and keeps them tracking in a substantially vertical plane.

The ball bearing assembly 5b illustrated in Figures XI and XII is shown in Figures XIII and XIV with the addition of a ball spacing ring 23c. The ring 23c is exactly like the ring 23 hereinbefore described and illustrated in detail in Figures IX and X.

Various modifications of the invention may be made without departing from the scope of the claims.

Having described the invention, I claim:

1. A device of the class described comprising, in combination, a bearing housing, a ball bearing assembly that is supported within the housing and that includes an outer race, an inner race, a series of bearing balls, and guiding means at the sides of the balls to keep the balls tracking in a substantially vertical plane, the guiding means at one side of the balls being depressed in an area below the inner race to permit axial movement of the balls under load so that axial pressure of said balls under load against said guiding means having said depressed area does not occur, and retainer means for holding the ball bearing assembly within the housing.

2. A device of the class described according to claim 1 wherein the guiding means at one side of the balls comprises a thrust washer having a channel below the inner race to permit axial movement of the balls under load so that axial pressure of said balls under load against said thrust washer does not occur.

3. A device of the class described according to claim 1 wherein the guiding means at one side of the balls comprises a thrust washer having a circular guiding ridge above the inner race which ridge spaces the unloaded balls from the body of the thrust washer to permit axial movement of the balls under load below the inner race toward the body of the thrust washer so that axial pressure of said balls under load against said thrust washer does not occur.

4. A device of the class described comprising, in combination, a bearing housing, a ball bearing assembly that is supported within the housing and that includes an outer race, an inner race having a collar, a series of bearing balls, the collar of the inner race functioning as a guide for one side of the balls, and guiding means at the other side of the balls to keep the balls tracking in a substantially vertical plane, said guiding means being depressed in an area below the inner race to permit axial movement of the balls under load so that axial pressure of said balls under load against said guiding means does not occur, and retainer means for holding the ball bearing assembly within the housing.

5. A device of the class described according to claim 4 wherein the guiding means comprises a thrust washer having a channel below the inner race to permit axial movement of the balls under load so that axial pressure of said balls under load against said thrust washer does not occur.

6. A device of the class described according to claim 4 wherein the guiding means comprises a thrust washer having a circular guiding ridge above the inner race which ridge spaces the unloaded balls from the body of the thrust washer to permit axial movement of the balls under load below the inner race toward the body of the thrust washer so that axial pressure of said balls under load against said thrust washer does not occur.

7. A device of the class described comprising, in combination, a bearing housing, a ball bearing assembly that is supported within the housing and that includes an outer race, an inner race having a collar, a series of bearing balls, a thrust collar loosely mounted on the inner race at one side of the balls, the collar of the inner race functioning to axially position the thrust collar, and guiding means at the other side of the balls to keep the balls tracking in a substantially vertical plane, there being play between the collar of the inner race and the thrust collar to permit axial movement of the balls under load so that substantial axial pressure of said balls under load against said thrust collar does not occur, said guiding means being depressed in an area below the inner race to permit axial movement of the balls under load so that axial movement of said balls under load against said guiding means does not occur, and retainer means for holding the ball bearing assembly within the housing.

8. A device of the class described according to claim 7 wherein the guiding means comprises a thrust washer having a channel below the inner race to permit axial movement of the balls under load so that axial pressure of said balls under load against said thrust washer does not occur.

9. A device of the class described according to claim 7 wherein the guiding means comprises a thrust washer having a circular guiding ridge above the inner race which ridge spaces the unloaded balls from the body of the thrust washer to permit axial movement of the balls under load below the inner race toward the body of the thrust washer so that axial pressure of said balls under load against said thrust washer does not occur.

10. A device of the class described comprising, in combination, a bearing housing, a ball bearing assembly that is supported within the housing and that includes an outer race, an inner race, a series of bearing balls, a ball spacing ring that is symmetrical with respect to the plane of rotation of the balls, and guiding means at the sides of the balls to keep the balls tracking in a substantially vertical plane, the guiding means at one side of the balls being depressed in an area below the inner race to permit axial movement of the balls under load so that axial pressure of said balls under load against said guiding means having said depressed area does not occur, and retainer means for holding the ball bearing assembly within the housing.

11. A device of the class described according to claim 10 wherein the guding means at one side of the balls comprises a thrust washer having a channel below the inner race to permit axial movement of the balls under load so that axial pressure of said balls under load against said thrust washer does not occur.

12. A device of the class described according to claim 10 wherein the guiding means at one side of the balls comprises a thrust washer having a circular guiding ridge above the inner race which ridge spaces the unloaded balls from the body of the thrust washer to permit axial movement of the balls under load below the inner race toward the body of the thrust washer so that axial pressure of said balls under load against said thrust washer does not occur.

13. A device of the class described comprising, in combination, a bearing housing, a ball bearing assembly that is supported within the housing and that includes an outer race, an inner race having a collar, a series of bearing balls, a ball spacing ring that is symmetrical with respect to the plane of rotation of the balls, the collar of the inner race functioning as a guide for one side of the balls, and guiding means at the other side of the balls to keep the balls tracking in a substantially vertical plane, said guiding means being depressed in an area below the inner race to permit axial movement of the balls under load so that axial pressure of said balls under load against said guiding means does not occur, and retainer means for holding the ball bearing assembly within the housing.

14. A device of the class described according to claim 13 wherein the guiding means comprises a thrust washer having a channel below the inner race to permit axial movement of the balls under load so that axial pressure of said balls under load against said thrust washer does not occur.

15. A device of the class described according to claim 13 wherein the guiding means comprises a thrust washer having a circular guiding ridge above the inner race which ridge spaces the unloaded balls from the body of the thrust washer to permit axial movement of the balls under load below the inner race toward the body of the thrust washer so that axial pressure of said balls under load against said thrust washer does not occur.

16. A device of the class described comprising, in combination, a bearing housing, a ball bearing assembly that is supported within the housing and that includes an outer race, an inner race having a collar, a series of bearing balls, a ball spacing ring that is symmetrical with respect to the plane of rotation of the balls, a thrust collar loosely mounted on the inner race at one side of the balls, the collar of the inner race functioning to axially position the thrust collar, and guiding means at the other side of the balls to keep the balls tracking in a substantially vertical plane, there being play between the collar of the inner race and the thrust collar to permit axial movement of the balls under load so that substantial axial pressure of said balls under load against said thrust collar does not occur, said guiding means being depressed in an area below the inner race to permit axial movement of the balls under load so that axial movement of said balls under load against said guiding means does not occur, and retainer means for holding the ball bearing assembly within the housing.

17. A device of the class described according to claim 16 wherein the guiding means comprises a thrust washer having a channel below the inner race to permit axial movement of the balls under load so that axial pressure of said balls under load aganst said thrust washer does not occur.

18. A device of the class described according to claim 16 wherein the guiding means comprises a thrust washer having a circular guiding ridge above the inner race which ridge spaces the unloaded balls from the body of the thrust washer to permit axial movement of the balls under load below the inner race toward the body of the thrust washer so that axial pressure of said balls under load against said thrust washer does not occur.

19. In a device of the class described, in combination, a ball bearing assembly comprising an outer race, an inner race, and a series of bearing balls, a housing for receiving and supporting the outer race, the housing having a radial wall to axially position the outer race, means for urging the outer race toward the radial wall, and guiding means at the sides of the balls to keep the balls tracking in a substantially vertical plane, the guiding means at one side of the balls being depressed in an area below the inner race to permit axial movement of the balls under load so that axial pressure of said balls under load against said guiding means having said depressed area does not occur.

20. In a device of of class described, in combination, a ball bearing assembly comprising an outer race, an inner race having a collar, and a series of bearing balls, a housing for receiving and supporting the outer race, the housing having a radial wall to axially position the outer race, means for urging the outer race toward the radial wall, the collar of the inner race functioning as a guide for one side of the balls, and guiding means at the other side of the balls to keep the balls tracking in a substantially vertical plane, said guiding means being depressed in an area below the inner race to permit axial movement of the balls under load so that axial pressure of said balls under load against said guiding means does not occur.

21. In a device of the class described, in combination, a ball bearing assembly comprising an outer race, an inner race having a collar, and a series of bearing balls, a housing for receiving and supporting the outer race, the housing having a radial wall to axially position the outer race, means for urging the outer race toward the radial wall, a thrust collar loosely mounted on the inner race at one side of the balls, the collar of the inner race functioning to axially position the thrust collar, and guiding means at the other side of the balls to keep the balls tracking in a substantially vertical plane, there being play between the collar of the inner race and the thrust collar to permit axial movement of the balls under load so that substantial axial pressure of said balls under load against said thrust collar does not occur, said guiding means being depressed in an area below the inner race to permit axial movement of the balls under load so that axial movement of said balls under load against said guiding means does not occur.

*22. A device of the class described comprising, in combination, a bearing housing, a ball bearing assembly that is supported within the housing and that includes an outer race, an inner race having a collar, a series of bearing balls, a thrust collar loosely mounted on the inner race at one side of the balls, the collar of the inner race functioning to axially position the thrust collar, and guiding means at the other side of the balls to keep the balls tracking in a substantially vertical plane, there being play between the collar of the inner race and the thrust collar to permit axial movement of the balls under load so that substantial axial pressure of said balls under load against said thrust collar does not occur, and retainer means for holding the ball bearing assembly within the housing.*

*23. A device of the class described comprising, in combination, a bearing housing, a ball bearing assembly that is supported within the housing and that includes an outer race, an inner race, a series of bearing balls, a thrust collar loosely mounted on the inner race at one side of the balls, positioning means for axially positioning the thrust collar, and guiding means at the other side of the balls to keep the balls tracking in a substantially vertical plane, there being play between the positioning means and the thrust collar to permit axial movement of the balls under load so that substantial axial pressure of said balls under load against said thrust collar does not occur, and retainer means for holding the ball bearing assembly within the housing.*

References Cited in the file of this patent or the original patent

UNITED STATES PATENTS

| | | |
|---|---|---|
| 1,556,997 | Johnston | Oct. 13, 1925 |
| 1,686,732 | Cheetham | Oct. 9, 1928 |
| 1,810,093 | Timson | June 16, 1931 |
| 1,979,663 | Bickelhaupt et al. | Nov. 6, 1934 |
| 2,602,229 | Larsen et al. | July 8, 1952 |